(12) United States Patent
Muirhead

(10) Patent No.: US 8,285,309 B2
(45) Date of Patent: Oct. 9, 2012

(54) SYSTEM FOR THE WIRELESS TRANSMISSION OF INFORMATION TO A MOBILE APPLIANCE OF A USER OF A MEANS OF TRANSPORT

(75) Inventor: Andrew Muirhead, Norderstedt (DE)

(73) Assignee: Lufthansa Technik AG, Hamburg (DE)

( * ) Notice: Subject to any disclaimer, the term of this patent is extended or adjusted under 35 U.S.C. 154(b) by 438 days.

(21) Appl. No.: 12/465,414

(22) Filed: May 13, 2009

(65) Prior Publication Data

US 2009/0286517 A1 Nov. 19, 2009

(30) Foreign Application Priority Data

May 13, 2008 (DE) .......................... 10 2008 023 249

(51) Int. Cl.
*H04W 24/00* (2009.01)
(52) U.S. Cl. ................................. 455/456.3; 455/456.1
(58) Field of Classification Search ..... 455/456.1–456.6
See application file for complete search history.

(56) References Cited

U.S. PATENT DOCUMENTS

| 6,389,337 | B1 * | 5/2002 | Kolls | 701/29 |
|---|---|---|---|---|
| 6,484,148 | B1 * | 11/2002 | Boyd | 705/14.64 |
| 6,529,728 | B1 * | 3/2003 | Pfeffer et al. | 455/418 |
| 6,650,902 | B1 * | 11/2003 | Richton | 455/456.3 |
| 6,879,838 | B2 * | 4/2005 | Rankin et al. | 455/456.6 |
| 2004/0203863 | A1 * | 10/2004 | Huomo | 455/456.1 |
| 2008/0040446 | A1 * | 2/2008 | Meyer | 709/217 |
| 2008/0045236 | A1 * | 2/2008 | Nahon et al. | 455/456.1 |

* cited by examiner

*Primary Examiner* — Steven Lim
(74) *Attorney, Agent, or Firm* — Baker Hostetler LLP

(57) ABSTRACT

A system for wirelessly transmitting information to a mobile appliance of a user of a means of transport. The system can include a first database containing journey-related information and a second database containing a profile for the user. The system can further include a first device configured to identify the mobile appliance of the user when the mobile appliance enters a range of a wireless local area network in the means of transport, a second device configured to select information from the first database based on the profile stored in the second database, and a third device configured to transmit the selected information to the mobile appliance of the user.

11 Claims, 1 Drawing Sheet

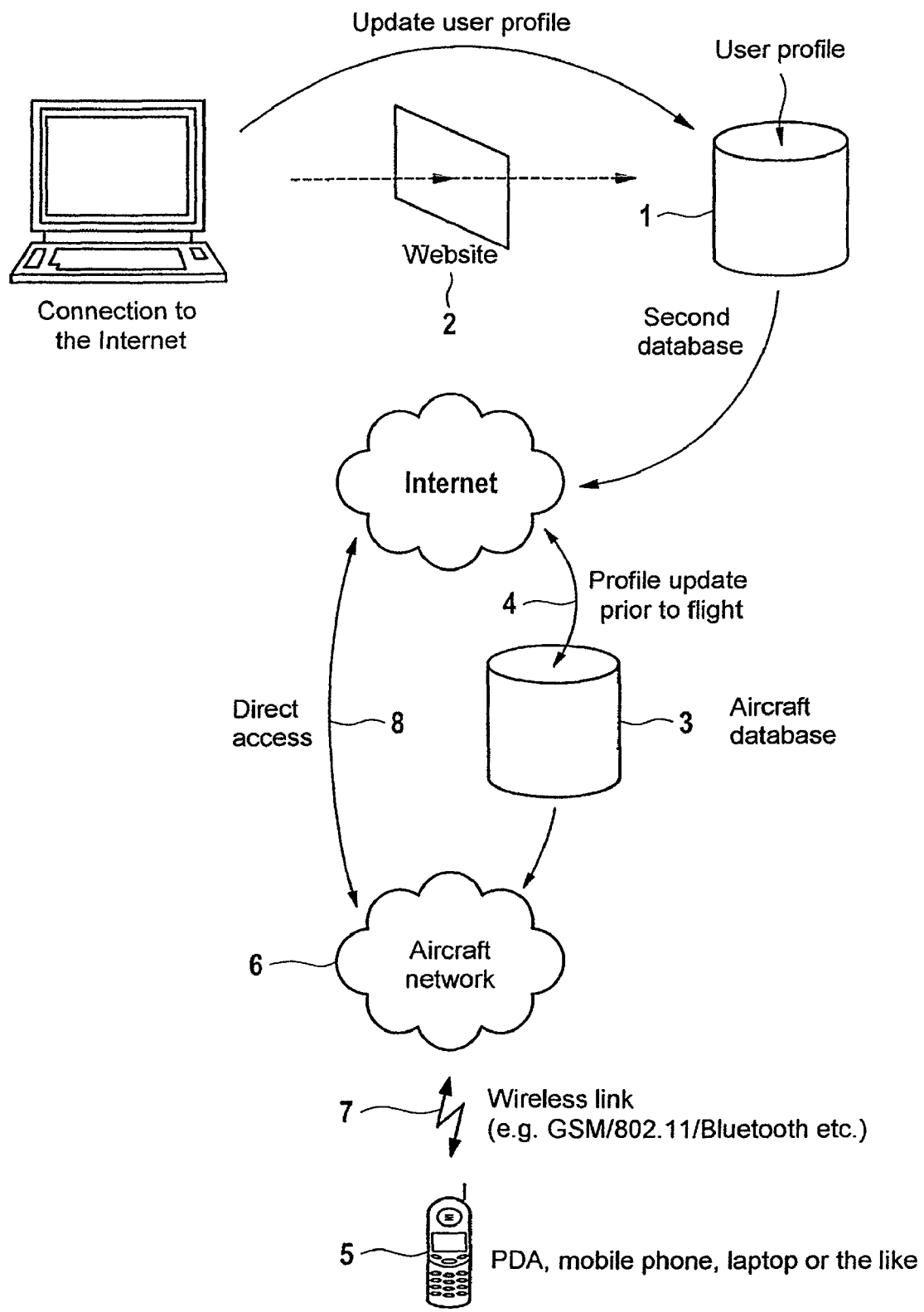

SYSTEM FOR THE WIRELESS TRANSMISSION OF INFORMATION TO A MOBILE APPLIANCE OF A USER OF A MEANS OF TRANSPORT

REFERENCE TO RELATED APPLICATIONS

This application claims the priority of German Patent Application No. 10 2008 023 249.1, filed May 13, 2008, the contents of which are incorporated herein by reference.

FIELD OF THE INVENTION

The invention relates to an arrangement for the wireless transmission of information to a mobile appliance of a user of a means of transport.

BACKGROUND OF THE INVENTION

Users of means of transport such as aircraft and railways are sent journey-related information by the operator of the means of transport in various ways before the start of a journey, during the journey and following the conclusion of the journey. Such information is usually conveyed by announcements, on onboard screens in the means of transport or the like.

SUMMARY OF THE INVENTION

The invention is based on the object of providing an arrangement of the type cited at the outset which allows such relevant information to be conveyed in a manner which is convenient and simple for the user of the means of transport. The invention achieves this object for an arrangement as cited at the outset by means of the following features:
- a first database which is associated with the means of transport and which contains journey-related information;
- a second database which contains a profile for the user;
- a device for identifying the mobile appliance of the user when this mobile appliance enters the range of a wireless local area network in the means of transport;
- a device for selecting information from the first database using the profile stored in the second database;
- a device for transmitting the selected information to the mobile appliance of the user.

First of all, a few terms used within the context of the invention will be explained. The term means of transport covers any means of transport, particularly public means of transport such as particularly aircraft and railways. This means of transport has an associated first database. In this connection, associated means that the database is preferably stored in a computer on board the means of transport. Alternatively, the database may be stored in a computer outside the means of transport, in which case it is possible to set up a link to this database during the operation of the means of transport. This first database associated with the means of transport contains journey-related information. This is information which is or could be of interest to a user within the context of the journey undertaken by the means of transport. The term is explained in even more detail further below.

The arrangement according to the invention also has a second database which contains a profile for the user. The user therefore needs to be registered with the operator of the means of transport. Particular use habits or other data, such as seat preferences, preferred mealtimes or the like, form a profile for the user.

The arrangement has a device for identifying a mobile appliance of the user when this mobile appliance enters the range of a wireless local area network in the means of transport. In this case, the term mobile appliance denotes any "PDA" (Personal Digital Assistant) which is suitable for wireless communication, such as mobile phones, portable computers of all kinds or the like. The means of transport has a wireless local area network. The term denotes any wireless communication networks, such as mobile radio networks, wireless LANs, Bluetooth networks or the like. In this connection, local means that the network is operated by a device on board the means of transport, for example an appropriate W-LAN router, a device for creating a GSM picocell or the like.

A device for selecting information from the first database using the profile stored in the second database is provided. The profile therefore stores whether the user wishes to retrieve information from the first database and have it transmitted to his mobile appliance, and what information. By way of example, the profile may contain the information that the user regularly wishes to receive information about entry and customs regulations at the destination during a journey by a means of transport of the operator. Said selection device then selects the appropriate information from the first database at a suitable time and transmits it to the identified mobile appliance of the user by means of the wireless network. The second database will usually be stored on a fixed computer of the operator of the means of transport. The two databases can be linked in different ways for the purpose of performing said selection. If the first database is stored in a computer of the means of transport, for example, the selection device can immediately connect these two databases if, during the operation of the means of transport, it is continually possible, or at any rate at suitable times, to set up a connection between the computers of the means of transport and the fixed computer of the operator, for example using a mobile radio network, a satellite link or another suitable wireless connection. Alternatively, provision may be made for a profile of the user to be loaded onto a computer on board the means of transport prior to the start of the journey, so that it is available during the operation of the means of transport regardless of whether there is a link to a fixed computer. The profiles can be selected prior to the start of the journey, for example, using the bookings made, or alternatively it is possible for a selection to be made at the instant at which the user boards the means of transport and his mobile appliance is identified in the local area network in the means of transport. At this time, an aircraft is still at the gate, for example, which means that the profile of the user just identified can be retrieved and loaded onto a computer in the aircraft using the data links which exist locally at the gate.

In line with the invention, the selected information is transmitted to the mobile appliance of the user. Preferably, this involves what is known as push transmission, which is actively initiated by a computer on board the means of transport. The pushed information is preferably stored in a local memory of the mobile appliance and is therefore kept locally for the user. This has the advantage that he is able to retrieve appropriate information (such as customs or entry formalities) from this local memory when needed, even after leaving the means of transport. The information can be transmitted using known protocols, such as emails, SMS, using the Internet Protocol or the like.

By way of example, the information in the first database may comprise flight, journey or transfer information (gate of the connecting flight or the like), entry and customs formalities at the destination, weather information, traffic and means of transport information for the destination, tourist information, hotel and/or restaurant information.

Within the context of the invention, it is preferred for the user to be able to create and/or alter his profile in the second database. Firstly, the profile can accept information which the user conveys to the operator of the means of transport during booking, for example. Secondly, provision is preferably made for the user to be able to view and preferably also change his profile. This can be done using the Internet, for example, so that the user can change his profile at any time. Alternatively or in addition, it is possible for the user to be able to view and change his profile while he is on board the means of transport, for example again using the Internet, the local radio area network in the means of transport and his mobile appliance or else using a proprietary access system on board the means of transport.

In line with another refinement of the arrangement according to the invention, it is possible for it to additionally comprise a device for transmitting profile information from the second database to service systems and/or the service personnel of the means of transport. By way of example, particular food requests from the user can be automatically transmitted to the service personnel from the second database. The preferred seat environment of the passenger (for example seat adjustment on the cruising flight, preferred video and/or audio entertainment programs) can be taken from the profile and stored in appropriate systems in the means of transport, so that they can be immediately retrieved by the user at his seat.

BRIEF DESCRIPTION OF THE DRAWINGS

An embodiment of the invention is explained below with reference to the following drawing, in which:

FIG. 1 is a schematic drawing depicting an exemplary system.

DETAILED DESCRIPTION OF THE INVENTION

In the example according to the invention, the means of transport is an aircraft. The airline has a second database 1, storing profiles of users (passengers), at a fixed location (on the ground). These user profiles are created, and updated, using booking data; alternatively or in addition, the user himself can view and change his profile using a website, indicated at 2, over the internet. The second database 1 is connected to the Internet.

On board the aircraft, there is an aircraft database (first database) 3, which stores journey-specific information of the kind described in more detail above. This journey-specific information can, insofar as the aircraft has a constant data link to the ground, be continually updated even during the journey, for example weather information for the destination. Alternatively or in addition, the journey information can be read into the aircraft database 3 prior to departure via a data link (cables or wireless) which is available at the gate or can be taken on board using a data storage medium (for example a USB stick, a DVD or the like).

The aircraft database 3 can also contain user-specific information or data which has/have been created and selected using the user profile of a booked passenger. If the user profile contains particular entertainment or film requests, for example, the aircraft database 3 can be provided with the appropriate data, for example the video and audio data for the requested film, prior to the start of the fight or possibly during the flight.

A link indicated at 4 is used for what is known as a profile update from the second database to the first database (aircraft database) prior to the start of the flight. This profile update is used to store information, locally in the aircraft database, about whether the respective user wishes to be provided with journey information from the aircraft database at what time, and what journey information. Such a profile update can actually be performed using the booking data and regardless of whether the respective passenger has already boarded the aircraft. By way of example, this profile update using the booking data allows an early update even with large volumes of data, for example when the passenger has stored a particular film request in his profile. Alternatively or in addition, a (possibly more advanced) profile update can be performed when the passenger actually boards the aircraft and his mobile appliance, indicated at 5, is actually identified in the local area aircraft network 6 by means of the wireless link indicated at 7. A profile update only when the passenger actually boards the aircraft has the advantage that it takes account of last-minute booking changes, no-shows or the like. A drawback is that if the passenger boards shortly before departure there may not be sufficient time left for a comprehensive update (for example transmission of video data for a film) or if the passenger boards the aircraft with his mobile appliance switched off, which means that he cannot be identified. A combination of these update options is therefore conceivable. By way of example, a profile update can initially be performed using the booking data, and additionally a further update can be performed as soon as the passenger actually boards the aircraft with his mobile appliance switched on. If appropriate, a further update process can also be initiated by the boarding process, since this involves the passenger being identified by means of his boarding card and it is therefore possible for a profile update to be initiated.

As soon as the mobile appliance 5 logs into the aircraft network 6 and is identified therein, it is possible for information from the aircraft database 3 to be transmitted to the mobile appliance 5.

Preferably, this is done by means of the already outlined push method, or alternatively interactive information transmission, for example using the Internet Protocol, is also possible. The relevant information is preferably stored in the local memory of the mobile appliance 5, so that it is still available to the passenger at any time (even after leaving the aircraft).

Other interaction between the mobile appliance 5 and devices in the aircraft via the aircraft network 6 is possible. By way of example, the passenger can use his mobile appliance 5 to convey service requests to the cabin personnel when required or (provided that there is an Internet link to the ground during the journey) can look at and possibly change his user profile in the second database 1 by means of direct access—indicated at 8—for example.

In addition, interactive options may be provided which, by way of example, allow currency conversion on the basis of exchange rates stored in the aircraft database 3 or allow the booking of transport and accommodation at the journey destination or the like. These interactions allow the mobile appliance 5 to be used for communication with the aircraft database 3 or else allow the direct access 8 and an Internet link to the ground to be used for communication with computers of the airline or of external service providers (for example hotel or car rental companies).

The invention claimed is:

1. A system for wirelessly transmitting information to a mobile appliance of a user of a means of transport, comprising:

a first database associated with the means of transport and containing journey-related information;

a second database containing a profile for the user;

a first device configured to identify the mobile appliance of the user when the mobile appliance enters a range of a wireless local area network in the means of transport;

a second device configured to select information from the first database based on the profile stored in the second database; and a third device configured to actively transmit the selected information to the mobile appliance of the user so that the selected information is locally stored in the mobile appliance of the user.

2. The system of claim 1, wherein the first database is stored in a computer arranged on board the means of transport.

3. The system of claim 1 or 2, wherein the journey-related information comprises at least one of flight information, transfer information, entry and customs formalities information for the destination, weather information, traffic and means of transport information for the destination, tourist information, hotel information, and restaurant information.

4. The system of claim 1 or 2, wherein the second database is stored in a computer of an operator of the means of transport.

5. The system of claim 1 or 2, wherein the user can create or alter the user's profile contained in the second database.

6. The system of claim 5, wherein the profile is accessible to the user via at least one of the Internet and the wireless local area network on board the means of transport using the mobile appliance.

7. The system of claim 1 or 2, wherein the wireless local area network in the means of transport is selected from the group comprising a mobile radio cell, a W-LAN and a Bluetooth network.

8. The system of claim 1, wherein the system is configured to retrieve profile information from the second database and to store a copy of the retrieved profile information in a computer in the means of transport when the mobile appliance of the user is identified.

9. The system of claim 1 or 2, wherein the third device is configured to actively transmit the selected information to the mobile appliance of the user.

10. The system of claim 1 or 2, wherein the selected information is transmitted to the mobile appliance of the user by means of email, SMS, or Internet Protocol.

11. The system of claim 1 or 2, further comprising a fourth device configured to transmit profile information from the second database to at least one of service systems and service personnel of the means of transport.

* * * * *